(12) United States Patent
Sakai et al.

(10) Patent No.: US 8,944,925 B2
(45) Date of Patent: Feb. 3, 2015

(54) VEHICULAR DAMPER DEVICE

(75) Inventors: Kazunori Sakai, Toyota (JP); Masataka Sugiyama, Toyota (JP); Yoshinori Morita, Toyota (JP); Tadashi Takemura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/988,206

(22) PCT Filed: Nov. 19, 2010

(86) PCT No.: PCT/JP2010/070719
§ 371 (c)(1),
(2), (4) Date: May 17, 2013

(87) PCT Pub. No.: WO2012/066680
PCT Pub. Date: May 24, 2012

(65) Prior Publication Data
US 2013/0244800 A1    Sep. 19, 2013

(51) Int. Cl.
| | | |
|---|---|---|
| *F16F 15/123* | (2006.01) | |
| *F16F 15/14* | (2006.01) | |
| *F16F 15/134* | (2006.01) | |
| *F16F 15/30* | (2006.01) | |
| *F16D 3/12* | (2006.01) | |
| *F16F 15/31* | (2006.01) | |

(52) U.S. Cl.
CPC ........... *F16F 15/1485* (2013.01); *F16F 15/134* (2013.01); *F16F 15/30* (2013.01); *F16D 3/12* (2013.01); *F16F 15/31* (2013.01)
USPC ........................ 464/68.41; 464/68.7; 464/67.1

(58) Field of Classification Search
USPC .................. 464/68.3, 68.4, 68.41, 68.7, 68.8; 192/213.11, 213.12, 213.21, 213.22, 192/214, 214.1
See application file for complete search history.

(56) References Cited

U.S. PATENT DOCUMENTS

| | | | |
|---|---|---|---|
| 4,751,993 A | | 6/1988 | Fukushima |
| 5,016,744 A | * | 5/1991 | Fischer et al. ........ 192/213.12 X |
| 5,505,288 A | * | 4/1996 | Tomiyama et al. .... 464/68.41 X |
| 5,598,745 A | * | 2/1997 | Tsuchiya ..................... 464/68.4 |
| 5,673,598 A | * | 10/1997 | Duclos .......................... 464/68.4 |
| 2004/0040815 A1 | | 3/2004 | Fukushima |

(Continued)

FOREIGN PATENT DOCUMENTS

| | | |
|---|---|---|
| CN | 101377224 A | 3/2009 |
| GB | 2 186 054 A | 8/1987 |

(Continued)

*Primary Examiner* — Gregory Binda
*Assistant Examiner* — Josh Skroupa
(74) *Attorney, Agent, or Firm* — Oliff PLC

(57) ABSTRACT

A vehicular damper device interposed between an engine and an output shaft and provided with a dual-mass flywheel includes: a first inertial body in the form of a disk connected to a crankshaft of said engine and rotatable about an axis of said crankshaft; a torsional damping portion interposed between said first inertial body and said output shaft; a second inertial body in the form of a disk rotatable about said axis and having a smaller outside diameter than said first inertial body, said second inertial body cooperating with said first inertial body to constitute said dual-mass flywheel; and an elastic member interposed between said first inertial body and said second inertial body and operatively connecting said first and second inertial bodies such that said elastic member is elastically deformable according to an amount of relative rotation of the first and second inertial bodies.

5 Claims, 4 Drawing Sheets

(56) References Cited

U.S. PATENT DOCUMENTS

| | | | |
|---|---|---|---|
| 2007/0278029 | A1 | 12/2007 | Sugiyama et al. |
| 2008/0078646 | A1* | 4/2008 | Ebata |
| 2009/0069098 | A1 | 3/2009 | Uehara et al. |
| 2009/0139825 | A1 | 6/2009 | Sugiyama et al. |
| 2010/0032259 | A1* | 2/2010 | Saeki et al. |
| 2011/0195793 | A1 | 8/2011 | Takeshita et al. |

FOREIGN PATENT DOCUMENTS

| | | |
|---|---|---|
| JP | A61-119844 | 6/1986 |
| JP | A-2007-247723 | 9/2007 |
| JP | A-2007-320494 | 12/2007 |
| JP | A-2009-115184 | 5/2009 |
| JP | A-2009-133378 | 6/2009 |
| JP | A-2010-101380 | 5/2010 |
| JP | A-2010-106948 | 5/2010 |

* cited by examiner

VEHICULAR DAMPER DEVICE

TECHNICAL FIELD

The present invention relates to a vehicular damper device, and more particularly to a construction of a damper capable of achieving a high damping effect.

BACKGROUND ART

There is well known a vehicular damper device which is provided in a power transmitting path between an engine and an output shaft, and which is constructed to restrict transmission of a torsional vibration during power transmission. Patent Document 1 discloses an example of such a vehicular damper device in the form of a dual-mass flywheel. In the dual-mass flywheel 1 disclosed in Patent Document 1, primary flywheel 11 and a secondary flywheel 12 are connected to each other through a torsion spring 13, and the secondary flywheel 12 is provided with a dynamic damper 2 which consists of a mass member 21 and an elastic body 22.

In the damper device constructed as described above, an inertia mass of the mass member 21 and rigidity of the elastic body 22 are adjusted such that a natural frequency of the dynamic damper 2 is substantially equal to that of the damper device, for reducing the amplitude of a vibration during generation of torsional resonance caused by a torque variation of the engine.

PRIOR ART DOCUMENT

Patent Document

Patent Document 1: JP-2009-115184A

SUMMARY OF THE INVENTION

Object Achieved by the Invention

By the way, in an engine which functions as a drive power source of a vehicle, a vibration component of explosion 1-order (revolution 2-order in the case of a four-cylinder engine) is conventionally a dominant resonance generating force of explosion. Keeping pace with a recent tendency toward the use of a lean-burn engine for improving the fuel economy, which leads to instability of combustion of the engine, resonance generating forces based on lower-order components such as revolution 1-order and revolution 0.5-order components which do not conventionally pose a problem also tend to increase. Although a torsional resonance frequency band of a revolution 2-order drive system is set to be not higher than normal operating speeds of the engine, torsional resonance of a revolution lower-order drive system is generated at the normal operating speeds of the engine, giving rise to a problem of an influence on NV characteristics and drivability of the vehicle.

As a method to solve the above-indicated problem, the dynamic damper 2 provided in the dual-mass flywheel 1 disclosed in Patent Document 1 is available to damp the torsional vibration. In the dual-mass flywheel 1 disclosed in Patent Document 1, however, the dynamic damper 2 is disposed in the secondary flywheel 12, so that a vibration energy absorbed by the dynamic damper 2 is small, whereby the torsional vibration is difficult to be effectively damped. This is because a vibration energy of a structural body during generation of torsional resonance generally increases with an increase of the inertia mass of the structural body, with a result of an accordingly increasing influence of the vibration energy on the torsional resonance, while on the other hand the inertia mass of the secondary flywheel 12 is smaller than that of the primary flywheel 11 connected to the engine through the crankshaft 100, so that the vibration energy of the secondary flywheel 12 during the torsional vibration is smaller. Accordingly, the dual-mass flywheel 1 disclosed in Patent Document 1 is not capable of achieving a high damping effect with respect to not only the torsional resonance of the above-indicated revolution 2-order drive system, but also the torsional resonance of low-order drive systems such as revolution 1-order and revolution 0.5-order drive systems.

As other means for solving the above-indicated problem, it is considered available to increase the spring rigidity of the prior art damper device for thereby increasing the natural frequency of the drive system, or to increase the hysteresis torque (internal friction resistance) of the damper device, so that the torsional vibration is reduced. However, these methods cause an increase of vibration transmission sensitivity at a frequency higher than the natural frequency, and generation of booming, rattling and other noises of the engine.

The present invention was made in view of the background art described above. It is therefore an object of the present invention to provide a vehicular damper device capable of achieving a high damping effect, without an increase of vibration transmission sensitivity at frequencies other than the natural frequency.

Means for Achieving the Object

The object indicated above is achieved according to the first aspect of the present invention, which provides (a) a vehicular damper device interposed between an engine and an output shaft and provided with a dual-mass flywheel consisting of a first inertial body and a second inertial body, (b) characterized by comprising (c) the above-described first inertial body in the form of a disk connected to a crankshaft of the above-described engine and rotatable about an axis of the crankshaft, (d) a torsional damping portion interposed between the above-described first inertial body and the above-described output shaft, (e) the above-described second inertial body in the form of a disk rotatable about the above-described axis and having a smaller outside diameter than the above-described first inertial body, and (f) an elastic member interposed between the above-described first inertial body and the above-described second inertial body and operatively connecting the above-described first and second inertial bodies such that the elastic member is elastically deformable according to an amount of relative rotation of the first and second inertial bodies, to absorb a vibration energy during generation of torsional resonance.

Advantages of the Invention

In the present vehicular damper device, a dynamic damper is constituted by the above-described second inertial body, and the above-described elastic member operatively connecting the second inertial body to the first inertial body. The first inertial body, which is disposed on the side of the engine, is considered to be connected to a structural body having a larger inertia mass, than where the first inertial body was disposed on the side of the output shaft. Namely, the first inertial body is a part of a structural body which includes the engine and which has a large inertia mass. Since the dynamic damper is connected to the first inertial body which is a part of the structural body having the large inertia mass, the dynamic damper achieves a high damping effect. This is because a vibration energy of a structural body during generation of torsional resonance generally increases with an increase of the inertia mass of the structural body, so that the dynamic damper, which is connected to the first inertial body which is the part of the structural body having the large inertia mass, effectively absorbs the vibration energy during generation of the torsional resonance. The damper device according to the present invention is basically identical in its damping characteristics with the conventional damper device, except for the provision of the dynamic damper in the present damper device, so that the present damper device does not increase the vibration transmission sensitivity at the frequencies other than the natural frequency.

In a preferred form of this invention, a friction mechanism consisting of friction plates and a coned-disk spring is disposed between the above-described first inertial body and the above-described second inertial body. In this form of the invention, a further vibration damping effect can be achieved by the friction mechanism, by adjusting the friction coefficients of the friction plates and the rigidity of the coned-disk spring.

MODE FOR CARRYING OUT THE INVENTION

An embodiment of the present invention will be described in detail by reference to the drawings. It is to be understood that the drawings showing the embodiment are suitably simplified or abbreviated and do not necessarily accurately represent the dimensions and shapes of the elements shown therein.

Embodiment

Figure 1:
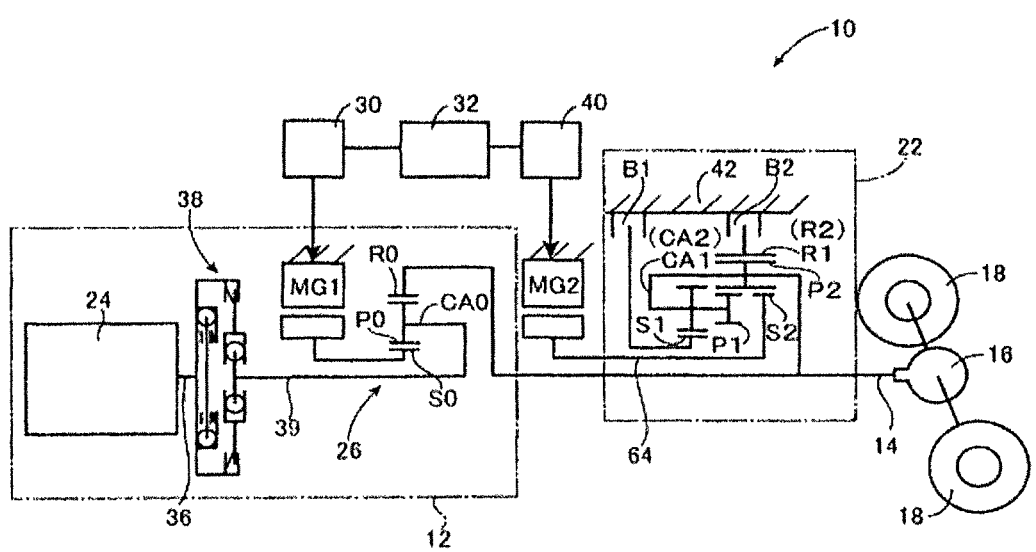
FIG. 1 is a schematic view showing an arrangement of a vehicular drive system of a hybrid type to which the present invention is applicable.

FIG. 1 is the schematic view showing the arrangement of a vehicular drive system 10 of a hybrid type to which the present invention is suitably applicable. As shown in FIG. 1, the vehicular drive system 10 is configured such that a torque of a primary drive power source in the form of a first drive power source 12 is transmitted to a wheel drive output shaft 14 functioning as an output member of a vehicle, and is then transmitted from the wheel drive output shaft 14 to a pair of right and left drive wheels 18 through a differential gear device 16. The present vehicular drive system 10 is provided with a second drive power source in the form of a second electric motor MG2 which is operable selectively in a vehicle driving mode for generating a vehicle drive force or a regenerative operation mode for regenerating an electric energy. This second electric motor MG2 is connected to the above-described wheel drive output shaft 14 through an automatic transmission 22. Accordingly, the output torque of the second electric motor MG2 to be transmitted to the wheel drive output shaft 14 is increased or reduced according to a speed ratio $\gamma s$ (=operating speed Nmg2 of the second electric motor MG2/rotating speed Nout of the wheel drive output shaft 14).

The automatic transmission 22 interposed-between the second electric motor MG2 and the drive wheels 18 is configured to have a plurality of speed positions the speed ratios of which are higher than "1". When the second electric motor MG2 is placed in the vehicle driving mode for generating a vehicle driving torque, the automatic transmission 22 can boost the output torque of the second electric motor MG2 to be transmitted to the wheel drive output shaft 14, so that the required capacity and size of the second electric motor MG2 can be further reduced. When the rotating speed Nout of the wheel drive output shaft 14 is increased with an increase of the running speed of the vehicle, the speed ratio $\gamma s$ of the automatic transmission 22 is reduced to reduce the operating speed Nmg2 of the second electric motor MG2 (hereinafter referred to as "second electric motor speed Nmg2"), for maintaining a high operating efficiency of the second electric motor MG2. When the rotating speed Nout of the wheel drive output shaft 14 is reduced, the speed ratio $\gamma s$ of the automatic transmission 22 is increased to increase the second electric motor speed Nmg2.

The first drive power source 12 is principally constituted by a primary drive power source in the form of an engine 24, a first electric motor MG1, and a planetary gear set 26 serving as a power distributing mechanism which is configured to synthesize the torques of the above-described engine 24 and first electric motor MG1, and distribute the torque to the engine 24 and first electric motor MG1. The above-described engine 24 is a known internal combustion engine such as a gasoline engine or a diesel engine, which generates a drive force by combustion of a fuel. An amount of opening of a throttle valve, an intake air quantity, an amount of supply of the fuel, an ignition timing and other operating states of the engine 24 are electrically controlled by an engine control electronic control unit (E-ECU) not shown, which is principally constituted by a microcomputer. The above-indicated electronic control unit is configured to receive output signals of sensors, such as an output signal of an accelerator pedal operation amount sensor AS indicative of an operation amount of an accelerator pedal, an output signal of a brake sensor BS indicating whether a brake pedal is in an operated state or not.

The above-described first electric motor MG1, which is a synchronous electric motor, for instance, selectively functions as an electric motor to generate a drive torque, or an electric generator, and is connected through an inverter 30 to an electric-energy storage device 32 such as a battery or capacitor. To regulate or set the output torque or regenerative torque of the first electric motor MG1, the inverter 30 is controlled by a motor/generator control electronic control unit (MG-ECU) not shown, which is principally constituted by a microcomputer.

The planetary gear set 26 is a planetary gear mechanism of a single-pinion type which performs a known differential function and which is provided with three rotating elements i.e., a sun gear S0, a ring gear R0 disposed coaxially with the sun gear S0, and a carrier CA0 supporting a pinion gear P0 meshing with the sun gear S0 and ring gear R0, such that the pinion gear P0 is rotatable about its axis and about the axis of the planetary gear mechanism. The planetary gear set 26 is disposed concentrically with the engine 24 and the automatic transmission 22. Since each of the planetary gear set 26 and the automatic transmission 22 is symmetrical in construction with respect to its axis, its lower half is not shown in FIG. 1.

In the present embodiment, a crankshaft 36 of the engine 24 is connected to the carrier CA0 through a damper device 38 (vehicular damper device according to the invention) and an output shaft 39. On the other hand, the first electric motor MG1 is connected to the sun gear S0, and the wheel drive output shaft 14 is connected to the ring gear R0. The carrier CA0 functions as an input element, and the sun gear SO functions as a reaction element, while the ring gear R0 functions as an output element.

The above-described planetary gear set 26 is configured such that when the reaction torque of the first electric motor MG1 is transmitted to the sun gear S0 while the output torque of the engine 24 is transmitted to the carrier CA0, the output element in the form of the ring gear R0 directly receives the torque, so that the first electric motor MG1 functions as the electric generator. An operating speed Ne of the engine 24 (engine speed Ne) can be varied continuously (without a stepping change) by changing an operating speed Nmg1 of the first electric motor MG1 to increase or decrease while the rotating speed of the ring gear R0, that is, while the rotating speed Nout of the wheel drive output shaft 14 (output shaft speed Nout) is held constant.

The above-described automatic transmission 22 in the present embodiment is constituted by a pair of planetary gear mechanisms of a Ravigneaux type. Namely, the automatic transmission 22 is provided with a first sun gear S1 and a second sun gear S2, and a large-diameter portion of a stepped pinion P1 meshes with the first sun gear S1, while a small-diameter portion of the stepped pinion P1 meshes with a pinion P2, which meshes with a ring gear R1 (R2) disposed coaxially with the above-indicated sun gears S1, S2. The above-indicated pinions P1, P2 are supported by a common carrier CA1 (CA2) such that each pinion P1, P2 is rotatable about its axis and about the axis of the automatic transmission 22. The second sun gear S2 meshes with the pinion P2.

The above-described second electric motor MG2 is controlled through an inverter 40 by the above-described motor/generator control electronic control unit (MG-ECU), such that the second motor generator MG2 functions as an electric motor or an electric generator, and to regulate or set an assisting drive torque or a regenerative torque. The second electric motor MG2 is connected to the second sun gear S2, and the above-indicated carrier CA1 is connected to the wheel drive output shaft 14. The first sun gear S1 and the ring gear R1 cooperate with the pinions P1 and P2 to constitute a mechanism equivalent to a planetary gear set of a double-pinion type, while the second sun gear S2 and the ring gear R1 cooperate with the pinion P2 to constitute a mechanism equivalent to a planetary gear set of a single-pinion type.

The automatic transmission 22 is provided with a first brake B1 which is disposed between the first sun gear S1 and a stationary member in the form of a housing 42, to selectively place the first sun gear S1 in a locked state, and a second brake B2 which is disposed between the ring gear R1 and the housing 42, to selectively place the ring gear R1 in a locked state. Each of these brakes B1 and B2 is a so-called frictional coupling device configured to generate a frictional braking force, and may be a coupling device of a multiple-disk type or a band type. The torque capacities of the brakes B1 and B2 are continuously variable according to engaging pressures applied to respective brakes B1 and B2 hydraulic actuators in the form of hydraulic cylinders, for example.

The thus constructed automatic transmission 22, wherein the second sun gear S2 functions as an input element while the carrier CA1 functions as an output element, is placed in a high-speed position H having the speed ratio γsh higher than "1", when the first brake B1 is placed in its engaged state, and in a low-speed position L having the speed ratio γsl higher than the speed ratio γsh of the high-speed position H, when the second brake B2 in place of the first brake B1 is placed in its engaged state. Namely, the automatic transmission 22 is a two-step transmission which is selectively placed in the high-speed position H or the low-speed position L, on the basis of the vehicle running condition represented by the vehicle speed V and the required vehicle drive force (or the operation amount of the accelerator pedal). Described more specifically, the automatic transmission 22 is controlled to be shifted to one of the two speed positions H, L on the basis of the detected vehicle running condition, and according to a predetermined shifting map (shifting lines).

In the vehicular drive system 10 of the present embodiment, the electric motors (first electric motor MG1 and second electric motor MG2) are provided in a power transmitting path from the damper device 38 to the drive wheels 18, so that a downstream portion lower than the damper device 38 of an entire power transmitting path (on the side of the drive wheels 18) has a comparatively larger inertia mass. Therefore, the amplitude of a torsional vibration during generation of torsional resonance caused by a torque variation of the engine 24 tends to be large. This is because a vibration energy of a structural body during generation of torsional resonance generally increases with an increase of the inertia mass of the structural body, with a result of an accordingly increasing influence of the vibration energy on the torsional resonance.

The engine 24 provided in the present embodiment is designed to be a lean-burn engine, and tends to suffer from instability of combustion (incomplete combustion and the like). Accordingly, resonance generating force of explosion based on the lower-order components such as the revolution 1-order and revolution 0.5-order components tend to increase, as well as a conventionally dominant resonance generating force of explosion of the engine 24 based on the explosion 1-order (revolution 2-order in the case of the four-cylinder engine) component. Conventionally, therefore, the torsional resonance is generated by the resonance generating force based on the lower-order components such as the revolution 1-order and revolution 0.5-order components at the normal operating speeds of the engine, in addition to the torsional resonance (of the revolution 2-order component) generated at the engine operating speeds not higher than the normal operating speeds, so that the resonance generating forces give a considerable influence on the NV characteristics and drivability of the vehicle. It is noted that the resonance generating force of the revolution 1-order component is the force based on one time of explosion per one revolution of the engine, and the resonance generating force of the revolution 2-order component (explosion 1-order component in the case of the four-cylinder engine) is the force based on two times of explosion per one revolution of the engine, while the resonance generating force of the revolution 0.5-order component is the force based on a half of one time of explosion per one revolution of the engine (namely, one time of explosion per two revolutions of the engine).

To solve the above-indicated problem, the prior art damper device has an increased degree of spring rigidity to increase the natural frequency of the drive system, or has an increased hysteresis torque of the damper device, for damping the torsional resonance. However, the prior art damper device suffers from increased vibration transmission sensitivity (gain) at frequencies higher than the natural frequency of the drive system, and generation of booming, rattling and other noises of the engine. To the contrary, the damper device 38 according to the present embodiment is capable of effectively reducing the vibration amplitude during generation of torsional resonance, without an increase of the vibration transmission sensitivity at the higher frequencies. A structure and effects of such damper device 38 are described below.

Figure 2:
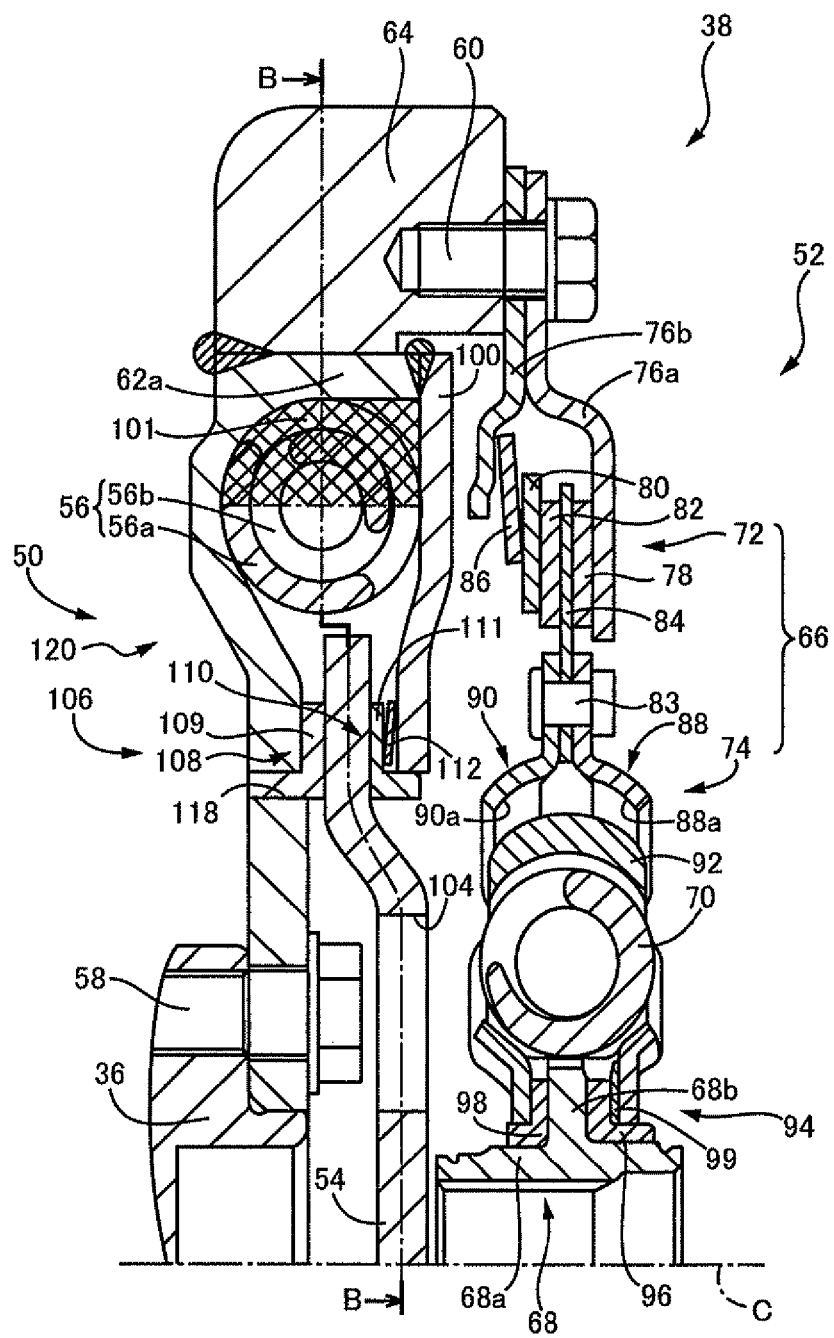
FIG. 2 is a cross sectional view showing in detail an arrangement of a damper device shown in FIG. 1.

FIG. 2 is the cross sectional view showing in detail an arrangement of the damper device 38 shown in FIG. 1. The damper device 38 according to the present embodiment is provided with a dual-mass flywheel consisting of a first flywheel 50 and a second flywheel 54, which will be described. The dual-mass flywheel is disposed on an axis C between the crankshaft 36 of the engine 24, and an output shaft 39 (shown in FIG. 1) which is rotatable relative to the crankshaft 36. While the output shaft 39 is not shown in FIG. 2, the output shaft 39 is held in spline engagement with an output rotary member 68 described below. Since the damper device 38 is symmetrical in construction with respect to the axis C, its lower half is not shown in FIG. 2.

The damper device 38 includes: the first flywheel 50, having a predetermined inertia mass, in the form of a disk (corresponding to a first inertial body according to the invention) fixed at its radially inner portion to the crankshaft 36 of the engine 24 and rotatable about the axis C; a torsional damping portion 52 interposed between the first flywheel 50 and the output shaft 39; the second flywheel 54 in the form of a disk (corresponding to a second inertial body of the present invention) disposed between the first flywheel 50 and the torsional damping portion 52 in the axial direction, rotatable about the axis C and having a smaller outside diameter than the first flywheel 50; and a dynamic damper spring device 56 in the form of coil springs (corresponding to an elastic member according to the invention), which is interposed between the first flywheel 50 and the second flywheel 54, so as to extend in a circumferential direction, and which operatively connects those first and second flywheels 50, 54 such that the dynamic damper spring device 56 is elastically deformable according to an amount of relative rotation of the flywheels 50, 54. The dynamic damper spring device 56 (hereinafter abbreviated as "D/D spring device 56") provided according to the embodiment consists of a first dynamic damper spring 56a, and a second dynamic damper spring 56b accommodated within the first dynamic damper spring 56a and having a smaller diameter than the first dynamic damper spring 56a. The first and second dynamic damper springs 56a and 56b will be hereinafter collectively referred to as "D/D spring device 56" unless it is necessary to distinguish them from each other. It is noted that the "axial direction" is the direction of extension of the axis C which is an imaginary centerline.

The first flywheel 50 is a disk-like member which has a predetermined inertia mass and which is fixed at its radially inner portion with screws 58 to the crankshaft 36, and fixed with at its radially outer portion with screws 60 to the torsional damping portion 52. The first flywheel 50 consists of a disk member 62 in the form of a disk fixed at its radially inner portion with the screws 58 to the crankshaft 36, and an annular inertial ring 64 disposed radially outwardly of and welded integrally to the disk member 62. The disk member 62 has a cylindrical portion 62a formed at its radial outer end so as to extend toward the torsional damping portion 52 in the direction parallel to the axis C. The inertial ring 64 is welded on its inner circumferential surface to the outer circumferential surface of the cylindrical portion 62a, so that the disk member 62 and the inertial ring 64 are rotated together as a unit.

The first flywheel 50 (inertial ring 64) is fixed with screws 60, at its axial end face remote from the engine 24, to a radially outer end portion of the torsional damping portion 52. Since the inertial ring 64 has a considerably large thickness in the axial direction, there is formed a space between the first flywheel 50 (disk member 62) and the torsional damping portion 52. The torsional damping portion 52 includes: an input rotary member 66 fixed with screws 60 at its radially outer portion to the inertial ring 64; an output rotary member 68 splined to the output shaft 39 so as to be rotated together with the output shaft 39 about the axis C; and a torsion spring 70 interposed between the input rotary member 66 and the output rotary member 68 and operatively connecting the input rotary member 66 and the output rotary member 68 such that the torsion spring 70 is elastically deformable according to an amount of relative rotation of the rotary members 66, 68.

The input rotary member 66 consists of a radially outer portion in the form of a torque limiter mechanism 72, and a radially inner portion in the form of a plate portion 74. The torque limiter mechanism 72 is configured to have a slipping action when a vehicle drive torque received from the engine 24 exceeds a predetermined permissible upper limit Tmax, so that the vehicle drive torque to be transmitted from the damper device 38 in the downstream direction (toward the drive wheels 18) is prevented from exceeding the permissible upper limit Tmax.

The torque limiter mechanism 72 includes: a pair of disk-like input plates 76a and 76b fixed at their radially outer portions with the screws 60 to the first flywheel 50 (inertial ring 64); a disk-like friction plate 78 fixed to a radially inner portion of the input member 76a; a disk-like friction plate 82 fixed to a disk-like intermediate member 80; a disk-like lining plate 84 sandwiched in its axial direction at its radially outer portion by and between the friction plates 78, 82 and fixed at its radially inner portion with rivets 83 to the plate portion 74; and a coned-disk spring 86 in the form of a conical disk interposed in its axial direction between the intermediate member 80 and a radially inner portion of the input plate 76b.

The coned-disk spring 86, which is interposed between the intermediate member 80 and the radially inner portion of the input plate 76b, generates an elastic resilient force pressing the intermediate member 80 against the friction plate 82, with a result of generation of friction forces between the friction plates 78, 82 and the lining plate 84. In this connection, it is noted that the rigidity of the coned-disk spring 86, and the friction coefficients of the friction plates 78, 82 are determined by experimentation or calculation such that the friction plates 78, 82 slip on (frictionally rotate relative to) the lining plate 84 against the above-indicated friction forces when the torque limiter mechanism 72 receives the vehicle drive torque exceeding the predetermined permissible upper limit Tmax. Accordingly, the torque limiter mechanism 72 prevents the damper device 38 from receiving the torque exceeding the permissible upper limit Tmax, and protects the damper device 38, the planetary gear set 26, etc. against their damage and deterioration of their durability due to an excessively large torque transmitted thereto.

The plate portion 74 consists of a disk-like first plate 88 and a disk-like second plate 90. Radially outer portions of the first and second plates 88, 90 are fixed together with the rivets 83 such that the radially inner portion of the lining plate 84 is sandwiched by and between the first and second plates 88, 90. The first and second plates 88, 90 respectively define a first opening 88a and a second opening 90a accommodating the torsion spring 70.

The output rotary member 68 includes a cylindrical hub portion 68a having a toothed inner circumferential surface for spline engagement with the output shaft 39 at its radially inner portion, and a disk-like flange portion 68b extending radially outwardly from an outer circumferential surface of the hub portion 68a. The flange portion 68b has four protrusions which are equally spaced apart from each other in its circumferential direction and which define a space therebetween in which the torsion spring 70 is disposed.

The torsion spring 70 is interposed between the input rotary member 66 (the first and second plates 88, 90) and the output rotary member 68 (the flange portion 68a) and operatively connects the input rotary member 66 and the output rotary member 68 such that the torsion spring 70 is elastically deformable according to the amount of relative rotation of the rotary members 66, 68. The torsion spring 70 is retained by a spring retaining member 92 formed of a reinforced plastic material fixed to the flange portion 68a, for example.

Radially inwardly of the torsion spring 70, there is disposed a hysteresis mechanism 94 configured to generate a hysteresis torque of the torsional damping portion 52. The hysteresis mechanism 94 includes: a pair of friction plates 96 and 98 which are L-shaped in cross section and which are respectively disposed in a gap between a radially inner portion of the first plate 88 and the flange portion 68b and a gap between the radially inner portion of the second plate 90 and the flange portion 68b; and a coned-disk spring 99 disposed in a gap between the friction plate 96 and the first plate 88. The hysteresis torque acting between the flange portion 68b and the first and second plates 88, 90 is generated on the basis of an elastic resilient force of the coned-disk spring 99. It is noted that the rigidity of the coned-disk spring 99 and the friction coefficients of the friction plates 96, 98 are adjusted to suitably adjust the hysteresis torque to be generated by the hysteresis mechanism 94.

A disk-like spring retaining plate 100 is welded at its radially outer end portion to one axial end of the cylindrical portion 62a of the disk member 62 of the first flywheel 50. Accordingly, the spring retaining plate 100 is rotated together with the first flywheel 50 about the axis C.

The dynamic damper spring device 56 (hereinafter abbreviated as "D/D spring device 56") is accommodated in an annular space defined by a wall surface of the above-described disk member 62, an inner circumferential surface of the cylindrical portion 62b, and a wall surface of the spring retaining plate 100. The D/D spring device 56 is retained so as to prevent its removal, while being sandwiched between the disk member 62 and the spring retaining plate 100 in their axial direction. The walls of the disk member 62 and the spring retaining plate 100 are bent so that an axial dimension of a radially inner portion of the above-indicated annular space is smaller than the diameter of the D/D spring device 56. Thus, a part of the wall of the disk member 62 is utilized as a mechanism to retain the D/D spring device 56, so that it is possible to avoid an increase of the number of the components required to retain the D/D spring device 56 for preventing its removal.

A radially outer portion of the above-indicated annular space, which is indicated by cross-hatching lines in FIG. 2, more specifically, in which the D/D spring device 56 is held in contact with the disk member 62, cylindrical portion 62a and spring retaining plate 100, is filled with a lubricating oil 101 such as a grease, which has a comparatively high viscosity.

Figure 3:
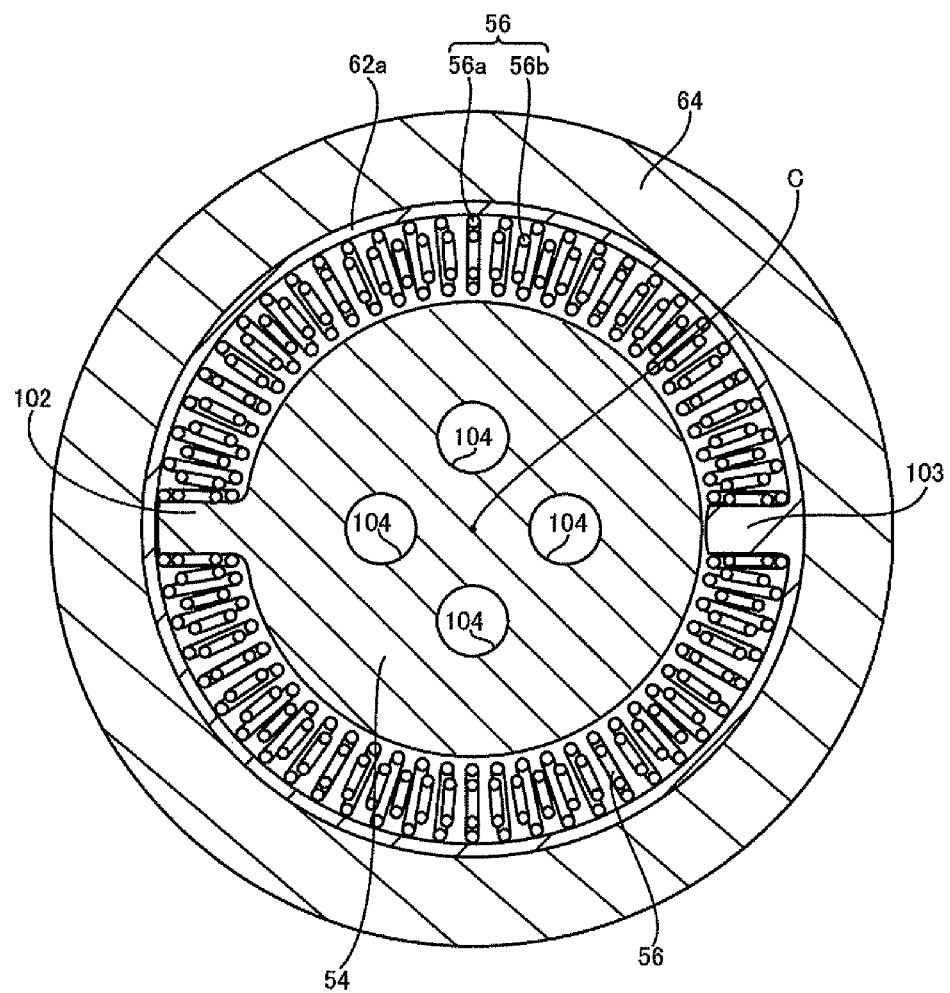
FIG. 3 is a cross sectional view of the damper device taken along line B-B of FIG. 2.

FIG. 3 is the cross sectional view taken along line B-B of FIG. 2. As shown in FIG. 3, the second flywheel 54 has a flange portion 102 extending radially outwardly to a point close to the inner circumferential surface of the cylindrical portion 62a. Further, the disk member 62 has a spring support wall 103 formed diametrically opposite to the flange portion 102 and extending radially inwardly to a point close to the outer circumferential surface of the second flywheel 54. These flange portion 102 and the spring support wall 103 define arcuate spaces circumferentially spaced apart each other, in which the D/D spring device 56 (first dynamic damper spring 56a and second dynamic damper spring 56b) are disposed in abutting contact with opposite wall surfaces of the flange portion 102 and spring support wall 103. In the present embodiment wherein one flange portion 102 and one spring support portion 103 are provided to define two arcuate spaces, the D/D spring device 56 is disposed so as to extend in each of the two arcuate spaces along the arcs of these spaces.

The second flywheel 54 has four round holes 104 in a radially inner portion thereof, through which the screws 58 are inserted during assembling of the damper device 38. Described more specifically, the second flywheel 54, D/D spring device 56 and spring retaining plate 100 are first attached to the first flywheel 50, and the screws 58 are then tightened through the round holes 104. For example, the first flywheel 50, second flywheel 54, D/D spring device 56, etc. are first assembled together to obtain a sub-assembly in a sub-assembly production line, and the obtained sub-assembly in which the D/D spring device 56, etc. is attached to the first flywheel 50 is then assembled onto the crankshaft 36 in a main production line. Accordingly, the assembling efficiency of the damper device 38 is improved.

Referring back to FIG. 2, a friction mechanism 106 is disposed radially inwardly of the D/D spring device 56. The friction mechanism 106 is provided with: a friction plate 108 disposed in a gap between the disk member 62 of the first flywheel 50 and the second flywheel 54; and a friction plate 110 and a coned-disk spring 112 in the form of a conical disk disposed in a gap between the second flywheel 54 and a radially inner portion of the spring retaining plate 100.

The friction plate 108 is a cylindrical member having a flange portion 109 which extends radially outwardly from one axial end thereof and which is sandwiched by and between the disk member 62 and the second flywheel 54. The other axial end portion of the friction plate 108 is fitted in a plurality of fitting holes 118 formed in the disk member 62 such that the fitting holes 118 are spaced apart from each other in the circumferential direction of the disk member 62. Accordingly, the friction plate 108 is rotated together with the disk member 62. The friction plate 110 is a cylindrical member having a flange portion 111 which extends radially outwardly from one axial end thereof and which is sandwiched by and between the second flywheel 54 and the coned-disk spring 112. The coned-disk spring 112 is sandwiched by and between the flange portion 111 of the friction plate 110 and a radially inner portion of the spring retaining plate 100. The coned-disk spring 112 presses the friction plate 110 against the second flywheel 54, with its elastic resilient force. Accordingly, friction forces corresponding to the elastic resilient force of the coned-disk spring 112 are generated between the second flywheel 54 and the friction plates 108 and 110.

The friction mechanism 106 constructed as described above permits generation of the friction forces between the second flywheel 54 and the disk member 62 and spring retaining plate 100. It is noted that the friction forces generated by the friction mechanism 106 are set to optimum values by adjusting the friction coefficients of the friction plates 108 and 110 and the rigidity of the coned-disk spring 112.

There will be described an operation of the damper device 38 constructed as described above. A rotary motion of the engine 24 received by the crankshaft 36 is transmitted to the first flywheel 50, so that the first flywheel 50 is rotated together with the crankshaft 36. A rotary motion of the first flywheel 50 is transmitted to the torsional damping portion 52 through its input rotary member 66 thereof. A rotary motion of the input rotary member 66 is transmitted to the output rotary member 68 through the torsion spring 70, while the torsion spring 70 is elastically deformed according to an amount of relative rotation between the input rotary member 66 and the output rotary member 68. A rotary motion of the output rotary member 68 which is splined to the output shaft 39 is transmitted to the carrier CA0 of the planetary gear set 26 through the output shaft 39.

The rotary motion of the first flywheel 50 is also transmitted to the second flywheel 54 through the spring support wall 103, the D/D spring device 56 and the flange portion 102, while the D/D spring device 56 is elastically deformed according to an amount of relative rotation between the first flywheel 50 and the second flywheel 54. Namely, the D/D spring device 56 operatively connects the first flywheel 50 and the second flywheel 54 to each other such that the D/D spring device 56 is elastically deformable according to the amount of relative rotation between the first flywheel 50 and the second flywheel 54.

Since the first flywheel 50 is operatively connected to the second flywheel 54 through the D/D spring device 56 as described above, the D/D spring device 56 and the second flywheel 54 cooperate with each other to constitute a dynamic damper 120. Further, the friction mechanism 106 functions as a damping mechanism (a damping term) for the dynamic damper 120. The dynamic damper 120 using as an elastic member the D/D spring device 56 consisting of the coil springs has higher degrees of operating reliability and stability of torsion properties, and a higher degree of frequency robustness to a variation of the temperature, than other elastic members such as rubber members. Further, the dynamic damper 120 utilizes a portion of the wall of the disk member 62, making it possible to avoid an increase of the number of the required components, and accordingly reduce the cost of manufacture of the dynamic damper 120.

In the damper device 38 according to the present embodiment, the dynamic damper 120 which is principally constituted by the D/D spring device 56 and the second flywheel 54 is connected to the first flywheel 50. This first flywheel 50, which is connected to the engine 24 through the crankshaft 36, is a part of a structural body which includes the engine 24 and the crankshaft 36 and which has a large inertia mass. In this respect, the dynamic damper 120 which is connected to the first flywheel 50 is considered to be connected to the structural body having the large inertia mass. The expression "having a large inertia mass" is interpreted to mean that the inertia mass is larger than that of the structural body on the side of the output rotary member 68, that is, than that of the structural body including the output rotary member 68 and the output shaft 39.

Since the dynamic damper 120 is connected to the structural body (including the engine 24 and the first flywheel 50) having the large inertia mass, the dynamic damper 120 achieves a high vibration damping effect (vibration absorbing effect) during generation of torsional resonance. Generally, a vibration energy of a structural body during generation of torsional resonance increases with an increase of the inertia mass of the structural body. Since the present dynamic damper 120 is connected to the structural body having the large inertia mass, the vibration energy is effectively absorbed by the dynamic damper 120. Accordingly, the dynamic damper 120 connected to the first flywheel 50 effectively absorbs the vibration energy of the engine 24 and the first flywheel 50, achieving a high vibration damping effect, during generation of the resonance.

The basic characteristics (natural frequency) of the dynamic damper 120 are adjusted to be substantially equal to the frequency of the torsional resonance, by adjusting the inertia mass of the second flywheel 54 and the rigidity of the D/D spring device 56. Further, the damping term of the dynamic damper 120 is adjusted to a value optimum for restricting the torsional resonance, by adjusting the friction coefficients of the friction plates 108 and 110 which form the friction mechanism 106, the rigidity of the coned-disc spring 112, and the viscosity and amount of filling of the lubricant 101.

Further, the D/D spring device 56 is located radially outwardly of the torsion spring 70, and is formed so as to extend in the circumferential direction i.e., has an arch-like shape, so that the D/D spring device 56 has a relatively large maximum length of compression, whereby the required rigidity of the D/D spring device 56 can be reduced. Accordingly, the natural frequency of the dynamic damper 120 which is proportional to the rigidity of the D/D spring device 56 can be lowered. In addition, the D/D spring device 56 is constituted by the first dynamic damper spring 56a and the second dynamic damper spring 56b, so that the basic characteristics of the dynamic damper 120 can be optimized by adjusting the rigidity and length of each of those damper springs 56a and 56b.

Further, the first flywheel 50 is constituted by the disk member 62, and the inertial ring 64 welded to the outer circumferential surface of the disk member 62, so that the inertial ring 64 can be welded to the disk member 62 after the dynamic damper 120 and the friction mechanism 106 are attached to the disk member 62. In this connection, it is noted that the axial length (thickness) of the inertial ring 64 is selected so that there is formed a space between the first flywheel 50 and the torsional damping portion 52 the axial dimension of which is just sufficient to accommodate the dynamic damper 120. Accordingly, it is possible to prevent an unnecessarily large axial length of the damper device 38.

In the damper device 38 according to the present embodiment, the dynamic damper 120 is disposed adjacent to the disk member 62 of the first flywheel 50, and does not restrict the design of the torsional damping portion 52, permitting the use of a torsional damper of a conventional design as the torsional damping portion 52, making it possible to reduce the cost of manufacture of the damper device 38.

Figure 4:
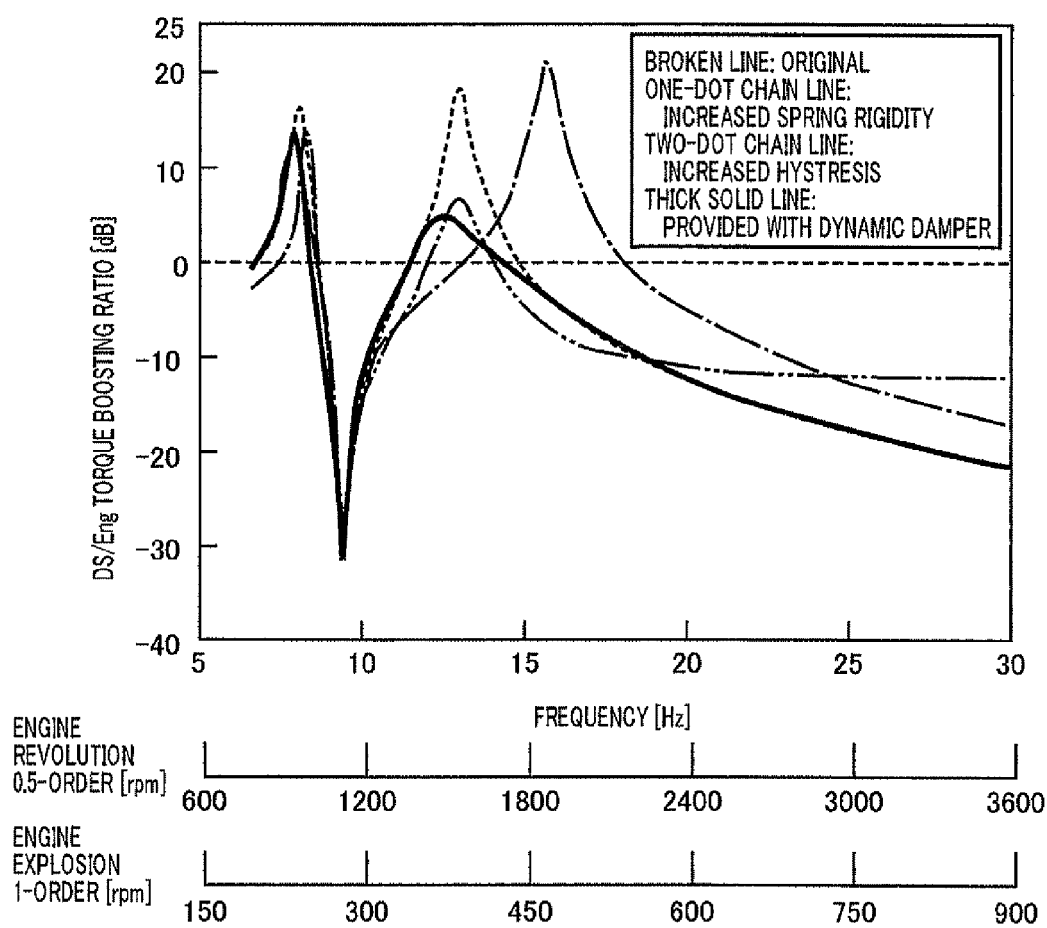
FIG. 4 is a graph indicating a torsional vibration damping effect achieved by the damper device of FIG. 1.

FIG. 4 is the view indicating a vibration damping effect achieved by the damper device 38 constructed as described above. In FIG. 4, the frequency is taken along the horizontal axis, while a torque boosting ratio of the wheel drive output shaft 14 to the engine 24 (the torque of the wheel drive output shaft 14/the engine torque) is taken along the vertical axis. The vibration transmission sensitivity increases with an increase of the torque boosting ratio. FIG. 4 also indicates the torsional vibration damping effects achieved by the following comparative examples: a damper device (indicated by a broken line representing "an original model") not provided with the dynamic damper 120; a damper device (indicated by a one-dot chain line representing "increased spring rigidity) not provided with the dynamic damper 120 and configured to deal with the torsional resonance by increasing the rigidity of a damper spring (corresponding to the torsion spring 70 in the present embodiment); and a damper device (indicated by a two-dot chain line representing "increased hysteresis") not provided with the dynamic damper 120 and configured to deal with the torsional resonance by increasing the hysteresis torque of the hysteresis mechanism 94.

Under the horizontal axis, there are indicated the engine operating speeds corresponding to the frequencies of the revolution 0.5-order and engine explosion 1-order (revolution 2-order in the case of the four-cylinder engine) components of vibration. For instance, the frequency of 15 Hz corresponds to 1800 rpm of the engine rotational speed in the case of the revolution 0.5-order component, and 450 rpm of the engine rotational speed in the case of the explosion 1-order (revolution 2-order in the case of the four-cylinder engine) component. It will be understood from FIG. 4 that the torsional resonance of the revolution 0.5-order component is generated at the normal engine operating speeds (generally, not lower than 1000 rpm).

As shown in FIG. 4, in the case of the damper device (hereinafter referred to as the "original model") indicated by the broken line, which is not provided with the dynamic damper 120, the torque boosting ratio has a peak value at a frequency around 13 Hz. Namely, the torsional resonance is generated at this frequency. In the case of the damper device (hereinafter referred to as the "increased spring rigidity model") indicated by the one-dot chain line, the spring rigidity of which is increased, on the other hand, the torsional resonance generated at the frequency around 13 Hz is more or less damped, but the torque boosting ratio is generally higher at higher frequencies than that of the original mode. In the case when the hysteresis torque is increased (hereinafter referred to as the "increased hysteresis model"), the torsional resonance generated at the frequency around 13 Hz is also more or less damped, but the torque boosting ratio is generally higher at the higher frequencies than that of the original model.

In the case of the damper device 38 according to the present embodiment, to the contrary, the torsional resonance generated at the frequency around 13 Hz is damped, and the torque boosting ratio at the higher frequencies is almost equal to that of the original model, as indicated by the thick solid line. That is, the damper device 38 according to the present embodiment exhibited a damping effect at the frequency of the torsional resonance, without deterioration of the torque boosting ratio (vibration transmission sensitivity) at the other frequencies. Namely, the vibration energy during generation of the torsional resonance is effectively absorbed by the dynamic damper 120, owing to the connection of the dynamic damper 120 to the first flywheel 50 which functions as a part of a structural body having a large inertia mass.

By the way, the torque limiter mechanism 72 does not operate in a normal running state of the vehicle, but operates when the input torque of the torque limiter mechanism 72 exceeds the upper torque limit Tmax in a specific running state of the vehicle. During generation of the torsional resonance, for example, the frequency of operation of the torque limiter mechanism 72 increases with an increase of the torque boosting ratio. However, the operation of the torque limiter mechanism 72 is not desired, that is, it is desirable to reduce the frequency of operation of the torque limiter mechanism 72. In the damper device 38 according to the present embodiment, the torque boosting ratio during generation of the torsional resonance is lowered by the dynamic damper 120, as indicated in FIG. 4, so that the frequency of operation of the torque limiter mechanism 72 is accordingly reduced, with a result of reduction of the amount of wear of the friction plates 78, 82 of the torque limiter mechanism 72, and increased stability of its torque limiting characteristics.

In the present embodiment described above, the dynamic damper 120 is constituted by the second flywheel 54, and the D/D spring device 56 operatively connecting the second flywheel 54 to the first flywheel 50. The first flywheel 50, which is disposed on the side of the engine 24, is considered to be connected to a structural body having a larger inertia mass, than where the first flywheel 50 was disposed on the side of the output shaft 39. Namely, the first flywheel 50 is a part of a structural body which includes the engine 24 and which has a large inertia mass. Since the dynamic damper 120 is connected to the first flywheel 50 which is a part of the structural body having the large inertia mass, the dynamic damper 120 achieves a high damping effect. This is because a vibration energy of a structural body during generation of torsional resonance generally increases with an increase of the inertia mass of the structural body, so that the dynamic damper 120, which is connected to the first flywheel 50 which is the part of the structural body having the large inertia mass, effectively absorbs the vibration energy during generation of the torsional resonance. The damper device according to the present embodiment is basically identical in its damping characteristics with the conventional damper device, except for the provision of the dynamic damper 120 in the present damper device, so that the present damper device does not increase the vibration transmission sensitivity at the frequencies other than the natural frequency.

The present embodiment is further configured such that the friction mechanism 106 consisting of the friction plates 108 and 110 and the coned-disk spring 112 is disposed between the first flywheel 50 and the second flywheel 54. Accordingly, a further vibration damping effect can be achieved by the friction mechanism 106, by adjusting the friction coefficients of the friction plates 108, 110 and the rigidity of the coned-disk spring 112.

The present embodiment is also configured such that the first flywheel 50 is characterized in that it consists of the disk member 62 fixed at its radially inner portion to the crankshaft 36 of the engine 24, and the annular inertial ring 64 disposed radially outwardly of and welded integrally to the disk member 62 at the radially inner portion thereof. In this configuration, the dynamic damper 120 and the friction mechanism 106 can be easily attached to the first flywheel 50, by welding the inertial ring 64 to the disk member 62, after the friction mechanism 106 and the dynamic damper 120 consisting of the D/D spring device 56 and the second flywheel 54 are attached to the disk member 62.

The present embodiment is further configured such that a part of the wall of the disk member 62 is utilized as the mechanism for retaining the D/D spring device 56, making it possible to avoid an increase of the number of the required components.

While the embodiment of this invention has been described in detail by reference to the drawings, it is to be understood that the present invention may be otherwise embodied.

In the illustrated embodiment, for example, the vehicular drive system 10 is of a hybrid type provided with the electric motors MG1 and MG2. However, the present invention is equally applicable to any type of drive system such as a drive system provided with a conventional vehicular automatic transmission, as well as to the hybrid type drive system.

While the D/D spring device 56 provided in the illustrated embodiment is configured such that the second D/D spring 56b is disposed radially inwardly of the first D/D spring 56a, the D/D spring device 56 need not be constituted by the two coil springs in the form of the first D/D spring 56a and the second D/D spring 56b, and may be constituted by one coil spring.

Although only one flange portion 102 and only one spring support wall 103 are formed in the illustrated embodiment, two or more flange portions and two ore more spring support walls may be formed. In this case, the number of the flange portions 102 and the number of the spring support walls 103 are equal to each other, and the flange portions and the spring support walls are arranged alternately in the circumferential direction. The number of the springs of the D/D spring device 56 is increased with an increase of the number of the flange portion 102 and spring support walls 103.

Although the D/D spring device 56 in the form of the coil springs is used as the elastic member, the elastic member is not limited to the coil spring or springs, but may be a rubbery member.

It is to be understood that the embodiment and its modifications have been described for illustrative purpose only, and

NOMENCLATURE OF REFERENCE SIGNS

24: Engine 36: Crankshaft 38: Vehicular damper device
39: Output shaft 50: First flywheel (First inertial body)
52: Torsional damping portion 54: Second flywheel (Second inertial body)
56: Dynamic damper spring device (Elastic member)
106: Friction mechanism 108: Friction plate 110: Friction plate
112: Coned disk spring

The invention claimed is:

1. A vehicular damper device interposed between an engine and an output shaft and provided with a dual-mass flywheel comprising:
 a first inertial body in the form of a disk connected to a crankshaft of said engine and rotatable about an axis of said crankshaft;
 a torsional damping portion interposed between said first inertial body and said output shaft, said torsional damping portion comprises an input rotary member connected to the first inertial body, an output rotary member connected to the output shaft, and a first elastic member interposed between the input rotary member and the output rotary member;
 a second inertial body in the form of a disk rotatable about said axis, said second inertial body (i) having a smaller outside diameter than said first inertial body, (ii) cooperating with said first inertial body to constitute said dual-mass flywheel, and (iii) extending in a radial direction to an axis between said crank shaft and said output shaft; and
 a second elastic member interposed between said first inertial body and said second inertial body and operatively connecting said first and second inertial bodies such that said second elastic member is elastically deformable according to an amount of relative rotation of the first and second inertial bodies, to absorb a vibration energy during generation of torsional resonance.

2. The damper device according to claim 1, further comprising a friction mechanism consisting of friction plates and a coned-disk spring is disposed between said first inertial body and said second inertial body.

3. The damper device according to claim 1, wherein the second inertial body cooperates with the second elastic member operatively connecting the second inertial body to the first inertial body to constitute a dynamic damper.

4. The damper device according to claim 1, wherein the first elastic member comprises a torsion spring.

5. The damper device according to claim 4, wherein the second elastic member comprises a first dynamic damper spring and a second dynamic damper spring, said second dynamic damper spring having a diameter smaller that said first dynamic damper spring.

* * * * *